July 2, 1968  R. ROSEBROOK, SR  3,390,859
TRACER CONTROL VALVE ASSEMBLY
Filed June 2, 1964
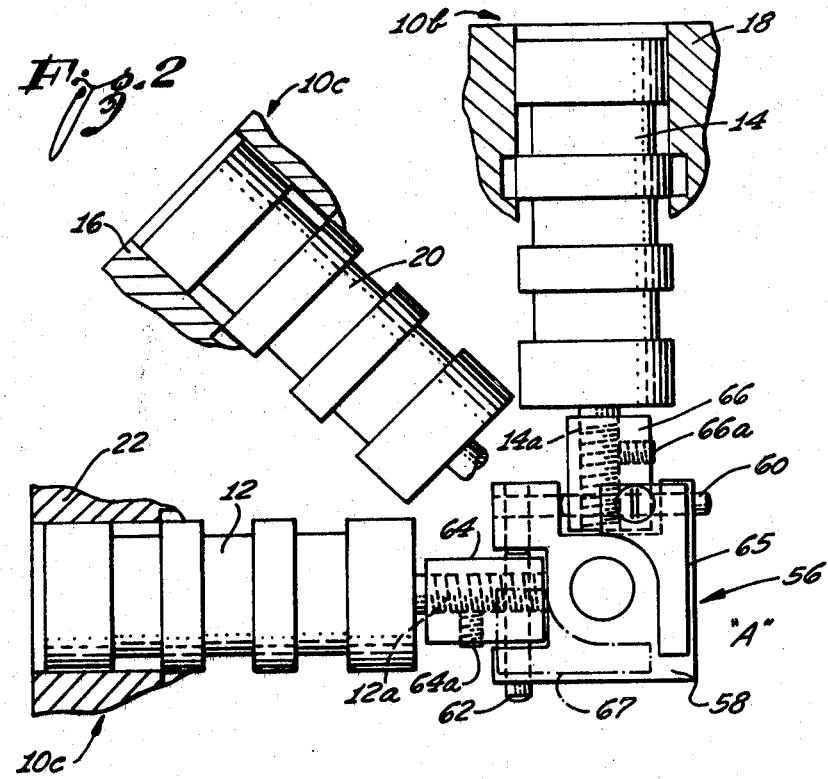
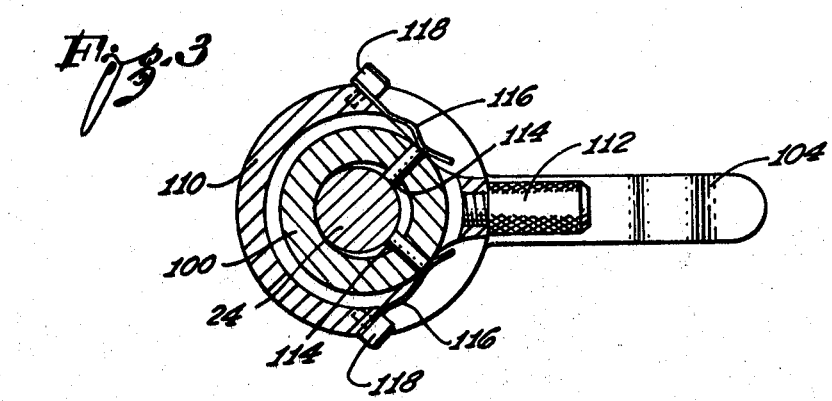
INVENTOR:
ROY ROSEBROOK, SR.

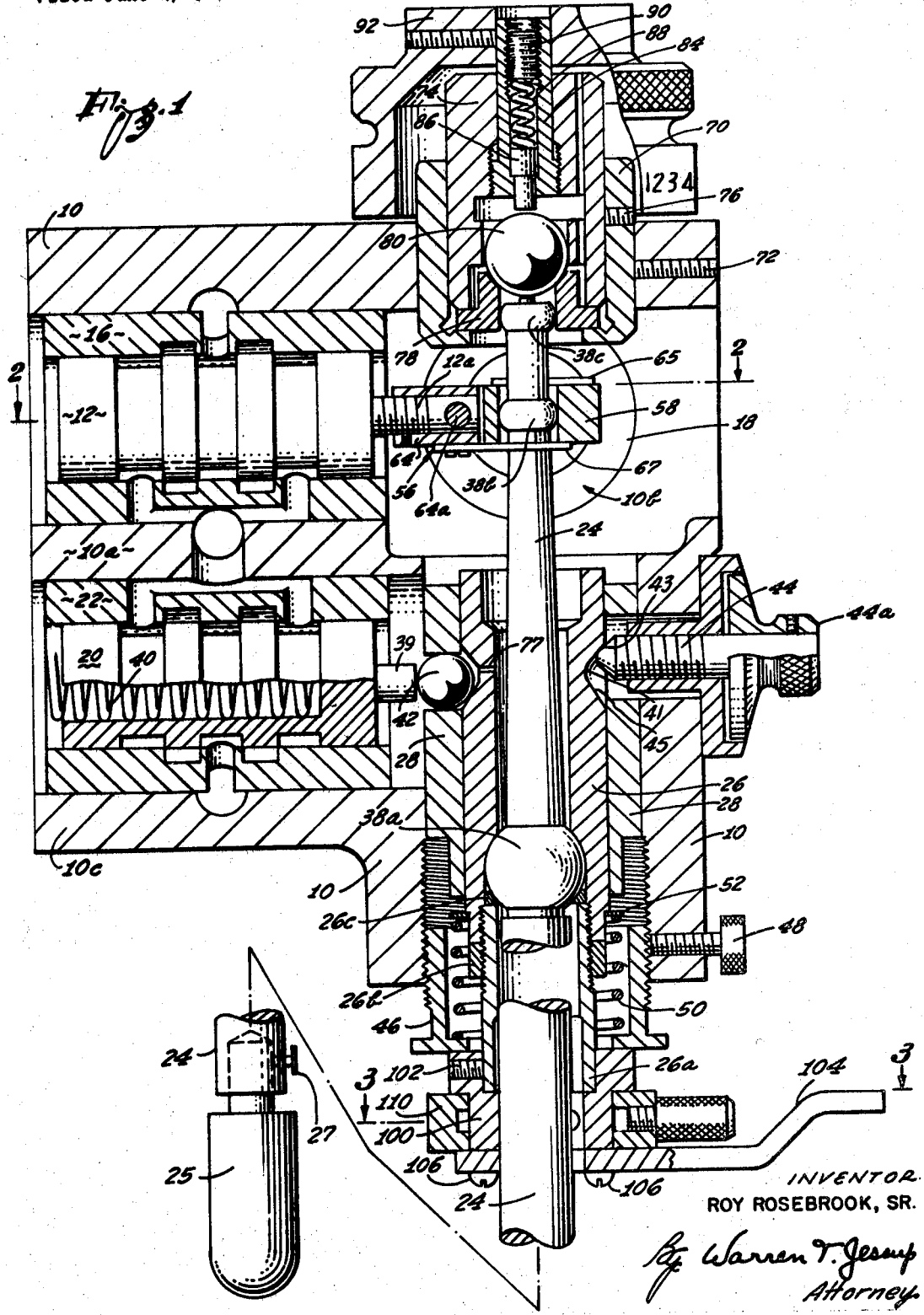

United States Patent Office 3,390,859
Patented July 2, 1968

3,390,859
TRACER CONTROL VALVE ASSEMBLY
Roy Rosebrook, Sr., 12048 Downey Ave.,
Downey, Calif. 90242
Filed June 2, 1964, Ser. No. 371,989
25 Claims. (Cl. 251—3)

The present invention relates to an improved tracer valve assembly for controlling an hydraulic valve mechanism in response to movement of a stylus over a three-dimensional template; the hydraulic mechanism being used, for example, to control the relative movements of a tool and workpiece in response to the three-dimensional movements of the stylus.

The tracer valve assembly to be described herein includes, for example, three hydraulic control valves, each having a cylinder and an internal spool. Two of these valves may be displaced perpendicularly to one another and to the axis of the stylus, and the third may be disposed at a selected angle to the other two and also perpendicular to the axis of the stylus. These three control valves represent movements of the stylus along three mutually perpendicular X, Y and Z-axes, in response to the three-dimensional movement thereof across the template. The stylus, as will be described, is mounted in the tracer valve assembly for pivotal movement about a universal pivot point and for longitudinal movement, so that the three vectors of movement may be obtained.

As will be described, the pivotal and reciprocal movements of the stylus in the tracer valve assembly of the invention controls the movements of the spools in the three cylinders of the hydraulic control valves. The controlled movements of the spools, in turn, control the flow of pressurized fluid through the three cylinders. This fluid control, by known types of associated hydraulic mechanisms, controls the relative movements of the aforesaid tool and workpiece.

An object of the present invention is to provide an improved tracer valve assembly of the type described briefly above.

Another object of the invention is to provide such an improved tracer valve assembly which is relatively simple and inexpensive to construct as compared with the prior art mechanisms of the same general type.

A still futher object of the invention is to provide such an improved tracer valve assembly which is simple to operate and which is extremely accurate and reliable.

Yet another object of the invention is to provide such an improved tracer valve assembly which is capable of responding, as mentioned above, to variations in the shape of the template in three dimensions, and of providing control vectors corresponding to movements along three mutually perpendicular axes.

A feature of the improved tracer valve assembly of the invention is the provision in the assembly of a simple mechanism for limiting the pivotal and longitudinal movement of the aforesaid stylus so as to constitute a rate control for the assembly.

Another feature of the improved tracer valve assembly of the invention is the provision therein for a mechanism for producing a fixed angular displacement of the stylus about its universal pivot point, and in a controllable direction, so as to cause the overall mechanism to follow a particular contour or vector without the need for a continuous manual pressure on the stylus.

Yet another feature of the improved tracer valve assembly of the present invention is the provision of a simple linkage assembly for translating pivotal movement of the stylus into two mutually perpendicular vectors extending essentially normal to the longitudinal axis of the stylus.

A further feature of the improved tracer valve assembly of the invention is the provision of a simplified linkage assembly for translating longitudinal movement of the stylus spindle in the valve housing into a vector essentially perpendicular to the longitudinal axis of the stylus.

Other features, objects and advantages of the improved assembly of the present invention will become apparent from a consideration of the following description, when the description is taken in conjunction with the accompanying drawings, in which:

FIGURE 1 is a side sectional view of an improved tracer valve assembly constructed in accordance with one embodiment of the invention;

FIGURE 2 is a cross-sectional view of the assembly of FIGURE 1 taken substantially along the line 2—2 of FIGURE 1 and illustrating the details of a linkage mechanism included in the assembly; and FIGURE 3 is a cross-sectional view of the assembly taken along the line 3—3 of FIGURE 1 and illustrating the details of a stylus control mechanism incorporated in the assembly.

The tracer valve assembly of the invention, as illustrated in FIGURES 1–3, includes a valve housing 10. The valve housing 10 is formed with a central tubular portion, and it includes a pair of cylinders 10a and 10b extending at right angles to the longitudinal axis of the tubular portion, and at right angles to one another.

The valve housing 10 also forms a third cylinder portion 10c which is displaced down from the portions 10a and 10b and which extends, for example, at right angles to the longitudinal axis of the tubular portion and at 45° to the portions 10a and 10b. The cylinder portion 10c is shown shifted angularly through 45° in FIGURE 1, for purposes of clarity.

A pair of spools 12 and 14 are disposed in respective ones of the cylinder portions 10a and 10b. A pair of bearing sleeves 16 and 18 are also disposed in respective ones of the cylinders. Likewise, a spool 20 is disposed in the cylinder portion 10c, and a sleeve 22 is positioned in the cylinder portion 10c in coaxial relationship with the spool 20.

Under the control of the tracer valve mechanism to be described, the spools 12, 14 and 20 are caused to move back and forth in their respective cylinder portions. The movement of the spool 12, for example, corresponds to X-vector motions, the movement of the spool 14, for example, corresponds to Y-vector movements, and movements of the spool 20 correspond to Z-vector movements of a spindle 24. The spindle 24 extends along a longitudinal axis through the tubular portion of the valve housing 10. A stylus 25 may be threaded, or otherwise removably mounted on the lower end of the spindle 24. The stylus may be held in place by a set screw 27. The stylus may be replaced by other styluses of different shapes.

A sleeve, or hollow carrier shaft, 26 is slidably mounted in the tubular portion of the valve housing 10 in coaxial relationship with the spindle 24. The sleeve 26 engages the inner surface of a tubular vertical bearing 28; the bearing being mounted in the tubular portion of the valve housing 10, and the bearing providing a vertical surface for sliding engagement by the sleeve 26. A further sleeve 26a is threaded into the lower end of the sleeve 26. The further sleeve is held in place by a lock nut 26b. The sleeve 26a adjustably supports a washer-like bearing 26c at its upper end.

The spindle 24 has a spherical-shaped ball-like portion 38a formed at a point intermediate its ends. This spherical-shaped portion 38 engages a mating groove in the sleeve 26 and the bearing 26c, so as to provide a universal pivot point for the spindle 24. It will be appreciated that when the stylus 25 is caused to follow a template in two dimensions, the spindle 24 will pivot in a universal manner about the pivot point at the center of the spherical-shaped portion 38a.

As mentioned above, the tracer valve assembly of the invention is capable of responding to three-dimensional variations of the template. Any variation in the template in a third dimension, for example, causes the sleeve 26 to slide up and down in the vertical bearing 28.

The spool 20 is spring-loaded as, for example, by means of an internal spring 40. This spring causes the end 39 of the spool to bear against a spherical member 42. The spherical member 42 is held in an aperture in the vertical bearing 28, and it is restrained in the aperture against all motion except reciprocal movement normal to the longitudinal axis of the spindle 24. A circumferential groove 41 is formed in the outer peripheral surface of the sleeve 26, having, as shown in FIG. 1, an upper cam surface 43 and a lower cam surface 45. The spherical-shaped member or ball 42 bears against the wall or surface 45 of the groove. As shown in FIG. 1, and as will be more fully understood hereinafter, the ball 42 is pushed outwardly, by the cam surface 45, a distance proportional to the upward movement of the sleeve 26 in the housing 28. When the sleeve 26 moves downward, the spring 40 forces the ball 42 inward against the cam surface 45. Thus, up-and-down movement of the sleeve 26, through engagement between the cam surface 45 and the ball 42, causes the spool valve 20 to move outward and inward. This actuates the hydraulic system to cause the entire assembly 10 to move up and down, respectively, in the manner well known in the art.

Therefore, reciprocal movement of the sleeve 26 in the vertical bearing 28, as the stylus 25 moves up and down, causes the ball 42 to move back and forth along an axis normal to the longitudinal axis of the spindle 24. This movement of the ball 42 causes the spool 20 to move back and forth in the cylinder portion 10c. The aforesaid motion of the spool 20 causes hydraulic fluid to flow in a controlled manner through the cylinder portion 10c, so as to control known associated hydraulic apparatus in accordance with the up and down movements of the stylus 25 along the Z-axis.

A threaded stop screw 44 having a pointed end is mounted in the wall of the housing 10, and the end of this stop engages the upper cam surface 43 of the groove 41 in the sleeve 26. The stop screw 44 may be turned so as to provide a desired engagement between its pointed end and the wall of the groove, so as to limit the extent of the downward movement of the sleeve 26. An appropriate calibrated knob 44a may be provided for the stop screw 44. As seen in FIG. 1, the setting of screw 44 determines the lower limit to which the sleeve 26 may come down in the housing. This limits the extent to which ball 42 can be moved inward against the cam surface 45 by the valve spring 40. In use, it is preferred to set the screw 44 approximately to the mid position on the upper cam surface 43. The spool valve 20 may then be adjusted so that when the sleeve 26, specifically the cam surface 43, is against the end of the screw 44, the valve spool 20 is in null position. Thereafter, a lifting of the spindle 24 as it rides over a template will force the ball 42 outward and operate the spool valve 20. If it is desired to bring about a lowering of the spindle 24, to operate the valve 20 in the opposite direction, the knob or dial 44a is turned so as to retract the screw 44 and allow the sleeve 26 to drop further within the housing 28.

A retainer bushing 46 is threaded into the lower end of the tubular portion of the valve housing 10, and this bushing is held against rotation by means, for example, of a lock screw 48. A counterbalance spring 50 is mounted in the housing 10, and this spring bears against the end wall of the bushing 46 and against a washer 52 which is supported by a shoulder in the sleeve 26. The counterbalance spring 50 normally holds the sleeve against the tension of the spring 40 in the spool 20, and counterbalances the weight of the stylus 25 and spindle 24. The counterbalancing is adjustable for different weights of styluses.

However, the spring 40 tends to override the action of the spring 50; so that the sleeve 26 is normally biased to the lower position shown in FIGURE 1, the extent of downward movement of the stylus being restrained by the stop screw 44. However, a slight upward pressure on the stylus causes the sleeve 26 to shift, so as to control the position of the spool 20 in the cylinder portion 10c.

The tracer valve mechanism of the invention, as illustrated in the drawings, also includes a linkage assembly 56. This linkage assembly couples a further intermediate point on the stylus spindle 24 to the spools 12 and 14 in the respective cylinder portions 10a and 10b.

As mentioned above, up and down movements of the stylus spindle 24 along the Z-axis causes the spool 20 to move back and forth in the cylinder portion 10c. By the same token, pivotal movements of the stylus spindle 24 about the center of the spherical-shaped pivot portion 38a causes the upper end of the stylus spindle 24 to move accordingly. The purpose of the linkage 56 is to resolve the pivotal movements of the stylus spindle into X- and Y-vector movements of the spools 12 and 14.

The linkage assembly 56, as shown in FIGURES 1 and 2, includes a block 58. This block has a rectangular configuration, in the illustrated embodiment, and it is disposed in a plane essentially normal to the longitudinal axis of the stylus spindle 24. The block 58 has a central aperture through which the stylus spindle extends, and the stylus spindle has a portion 38b of enlarged diameter which engages the bore of the aperture through the block 58.

The block 58 has a pair of guide pins 60 and 62 slidably mounted in it. These guide pins are positioned at right angles to one another, and they are disposed in the plane of the block 58. A connector member 66 is affixed to the pin 60 for limited movement therewith with respect to the block 58, and this member is connected to the spool 14. Likewise, a connector member 64 is affixed to the pin 62 for limited movement therewith with respect to the block 58, and this latter member is connected to the spool 12. A top plate 65 and a bottom plate 67 are affixed to the connector members 66 and 64 respectively. The connector member 64 is threaded to a shaft 12a extending from the spool 12 and is held against rotation by a set screw 64a. Likewise, the connector member 66 is threaded to a shaft 14a extending from the spool 14 and is held against rotation by a set screw 66a.

It will be appreciated that movements of the portion 38b of the spindle 24 along an axis corresponding to the longitudinal axis of the spool 12 causes the connector member 64 to move the spool 12 back and forth in the cylinder portion 10a, whereas the connector member 64 merely causes the guide pin 60 to slide along its longitudinal axis with respect to the block 58, so that no motion is transmitted to the spool 14. Likewise, any movement of the block 58 along the axis of the spool 14 produces corresponding movements of the spool 14 back and forth in the cylinder portion 10b as the connector member 66 merely causes the pin 62 to slide along its axis.

Therefore, all universal movements of the enlarged portion 38b of the spindle 24 are resolved by the linkage assembly 56 into X-vector and Y-vector movements of the spools 12 and 14. It will be appreciated that such movements of the spools 12 and 14 produce corresponding flows of hydraulic fluids through their associated cylinder portions 10a and 10b, so that the usual hydraulic equipment associated with the tracer valve assembly illustrated herein is properly controlled.

The tracer valve assembly of the embodiment of the invention illustrated in the drawings also includes a stop mechanism which controls the amount of pivotal movement of the spindle about the center of the spherical-shaped portion 38a, and which also may serve as a control for the longitudinal movements of the spindle 24 in the valve housing. This stop mechanism, therefore, serves as a rate control, since it serves to control the maximum rate at which the system will respond to pivotal and longitudinal movements of the spindle. The stop mechanism to be described includes an override feature, in that a spring-biased pin member indicates when the limit has been reached; however, additional pressure on the stylus can overcome the limiting effect of the pin.

The aforesaid stop mechanism is mounted in the top of the valve housing 10 in a cup-shaped member 70. The cup-shaped member 70 has a lower aperture which receives the upper extremity of the stylus spindle 24. The member 70 is supported in the upper end of the valve housing 10 by means, for example, of a set screw 72. A cylindrical-shaped retainer 74 is supported in the member 70, and is held in place by means, for example, of a lock screw 76.

The stop mechanism includes a centering ring member 78. This member has a central aperture which receives the extremity of the spindle 24. The upper extremity of the spindle includes a portion 38c of enlarged diameter which engages the bore of the aperture in the ring-shaped member 78.

The ring-shaped member 78 has an annular base portion which is supported by the lower end of the cup-shaped member 70, and which is free to slide in all directions along the lower end of that member. The ring-shaped member 78 also includes a central portion with an upper surface having a concave cone-like cam surface. A spherical member 80 rests in the upper portion of the ring member 78, and the spherical member 80 is supported by the member 74 in a manner such that it can move only along an axis corresponding to the longitudinal axis of the spindle 24.

The stop mechanism includes a bushing 84 which is threaded into the member 74. A pin 86 is supported in the bushing 84, and engages a shoulder at the lower end of the bushing. This shoulder holds the pin 86 in position such that its lower end may be adjustably positioned with respect to the spherical-shaped member 80. The pin 86 is spring-biased by a spring 88 in the bushing 84, and a set screw 90 is threaded into the bushing to hold the spring in place. The tension of the spring may be adjusted by adjusting the set screw 90.

A manual control knob 92 is mounted on the bushing 84, and this knob may be rotated to control the displacement of the pin 86 from the spherical-shaped member 80. The knob 92 may be calibrated, as shown.

It will be appreciated, that any pivotal movement of the spindle 24 about the center of the spherical-shaped portion 38a produces corresponding universal movements of its upper extremity. The resulting movements of the enlarged portion 38c at the upper extremity causes the ring-shaped member 78 to slide across the bottom of the cup-shaped member 70. Any movement of the ring-shaped member 78 causes its cammed surface to move along the spherical-shaped member 80. The member 80 is constrained to move only along an axis corresponding to the longitudinal axis of the spindle 24.

The pivotal movement of the stylus is thereby limited to a position in which the spherical-shaped member 80 engages the lower end of the pin 86. This limiting position may be adjusted, for example, by rotating the knob 92 to any desired setting of its scale. Also, when so desired, the effect of the stop mechanism may be overridden, merely by increasing the deflection pressure on the spindle 24, so that the spherical-shaped member 80 forces the pin 86 back against the tension of its spring 88.

As best shown in FIGURES 1 and 3, the illustrated assembly also includes a stylus bias control mechanism. This control mechanism serves to impart a full deflection on the spindle 24 in a predetermined direction, so as to cause the associated mechanism to be actuated along a desired vector. This actuation continues without the need for a continuous exertion of a manual deflection force on the stylus.

The bias control mechanism of FIGURES 1 and 3 includes a retainer bushing 100 which is affixed to the lower end of the sleeve 26a by means, for example, of a lock screw 102. A lever 104 is attached to the bushing 100 by means, for example, of screws 106, and this lever extends outwardly in a radial direction from the spindle.

It will be appreciated that the lever 104 may be rotated to any angular position, and that this rotation merely causes the sleeve 26 to rotate, and has no effect on the internal operation of the valve assembly, insofar as any of the spools or other operating components are concerned.

An annular member 110 is rotatably mounted on the bushing 100, and the ring-shaped member has a radial control arm 112. Manual adjustment of the control arm 112 may cause the ring 110 to rotate wtih respect to the bushing 100.

A pair of radial pins 114 are supported in the bushing 100, and these are freely slidable in apertures in the bushing. The inner ends of the pins 114 extend against the stylus spindle 24. A pair of flat springs 116 are supported on the ring 110 by means of corresponding screws 118. These springs are shaped so that when the ring 110 is moved to a particular angular position with respect to the bushing 100, the springs 116 do not engage the pins 114, so that no pressure is exerted against the stylus spindle 24.

However, when the ring 110 is turned to the position shown in FIGURE 3, the springs 116 engage the pins 114 and bias the pins inwardly against the stylus spindle 24. This causes the stylus spindle to be deflected to its full extent about the center of its universal pivot portion 38a.

It will be appreciated that the direction of the deflection may be controlled by turning the control lever 104 and the bushing 100 to any desired angular position with respect to the spindle 24.

In the operation of the control mechanism described above, it is merely necessary to turn the control lever 104 to a selected angular position corresponding to the desired vector to be traced. Then, the control arm 112 is moved into alignment with the lever 104, in the position shown in FIGURE 3, so that the springs 116 may engage the pins 114 and thereby deflect the stylus spindle 24 in the desired direction.

The mechanism in which the valve assembly is incorporated will then be caused to move along the indicated vector, and this movement will be continued until the control mechanism is released. This release is accomplished, by turning the handle 112 and bushing 100 to a position in which the pins 114 are freed from the springs 116.

The invention provides, therefore, an improved tracer valve assembly which is simple and straightforward in its construction, and which is easy to operate.

The improved tracer valve assembly of the present invention is particularly advantageous in the simplicity of its mechanisms whereby pivotal and longitudinal movements are translated into vectors normal to the axis of the stylus spindle.

The improved valve assembly of the invention is also advantageous in the improved manner in which an override type of stop mechanism is provided which is relatively simple in its structural composition, and which functions to advantage to provide a rate limit for the mechanism.

Also, the improved valve assembly of the invention incorporates a simple and convenient control mechanism by which a desired setting may be established in the assembly, and held so long as desired.

It will be appreciated that although a particular embodiment of the assembly has been shown and described, modifications may be made. The following claims are intended to cover all modifications which fall within the scope of the invention.

What is claimed is:

1. In a tracer valve assembly having a housing, an elongated spindle mounted in said housing for universal pivotal movement about a pivot point intermediate its ends, and control valve means actuated by pivotal movement of said spindle about said point, the combination of:
   a limit stop member mounted in said housing in spaced relationship with the end of said spindle;
   a first member engageable with said limit stop member and interposed between said stop member and said end of said spindle and having a cam surface;
   said limit stop member, when engaged by said first member, introducing a limiting force resisting pivotal movement of said spindle about said pivot point;
   a mounting bracket supporting said first member in said housing for movement along an axis corresponding to the longitudinal axis of said spindle and restaininng said first member from movement normal to such axis;
   a second member engaging said spindle to be moved by said spindle in a plane substantially normal to the axis of said spindle, whenever said spindle is pivoted about said pivot point and having a cam surface engaging the cam surface of said first member;
   and bracket means supporting said second member for lateral movement by said spindle, so that such lateral movement of said second member causes movement of said first member along said axis of movement thereof corresponding to said longitudinal axis of said spindle.

2. The combination defined in claim 1 and which includes a bias control mechanism for displacing said spindle angularly about the aforesaid universal pivot point.

3. The combination defined in claim 1 and which includes a link assembly coupled to said control valve means and to said spindle at a point between said end thereof and said universal pivotal point for translating the pivotal movements of said spindle about said universal pivotal point into two mutually perpendicular vectors of movement in said control valve means both essentially perpendicular to said longitudinal axis of said spindle.

4. The combination defined in claim 3 in which said link assembly includes a block slidably mounted on said spindle and extending in a plane perpendicular to said longitudinal axis is said spindle; first and second mutually perpendicular guide pins mounted on said block in essentially coplanar relationship therewith; a first connecting link mounted on said first pin for limited slidable movement with respect to said block along the longitudinal axis of said first pin; and a second connecting link mounted on said second pin for limited slidable movement with respect to said block along the longitudinal axis of said second pin.

5. In a tracer valve assembly having a housing, an elongated spindle mounted in said housing for universal pivotal movement about a pivot point intermediate its ends, and control valve means actuated by pivotal movement of said spindle about said point, the combination of:
   a limit stop member mounted in said housing in spaced relationship with the end of said spindle;
   a first spherical-shaped member engageable with said limit stop member and interposed between said stop member and said end of said spindle and having a cam surface;
   said limit stop member, when engaged by said spherical-shaped member, introducing a limiting force resisting pivotal movement of said spindle about said pivot point;
   a mounting bracket supporting said first member in said housing for movement along an axis corresponding to the longitudinal axis of said spindle and restraining said first member from movement normal to such axis;
   a second ring-shaped member surrounding and engaging said end of said spindle coaxial with the longitudinal axis of said spindle, to be moved by said spindle in a plane substantially normal to the axis of said spindle, whenever said spindle is pivoted about said pivot point, and having a concave cone-like cam surface engaging the cam surface of said first member;
   and bracket means supporting said second ring-shaped member for said movement by said spindle so that such movement of said ring-shaped member normal to the axis of said spindle causes movement of said first member along said axis of movement thereof corresponding to said longitudinal axis of said spindle.

6. In a tracer valve assembly having a housing, an elongated spindle mounted in said housing for universal pivotal movement about a point intermediate its ends, and control valve means, at least a portion of which is actuated by the pivotal movement of said spindle about said point, the combination of:
   a limit stop member mounted in said housing in spaced relationship with the end of said spindle and movable along an axis substantially corresponding to the longitudinal axis of said stylus;
   a spherical-shaped member engageable with said limit stop member and interposed between said limit stop member and said end of said spindle;
   a mounting bracket supporting said spherical-shaped member in said housing for movement along the axis of movement of said stop member and restraining said spherical-shaped member from movement normal to said last-mentioned axis;
   a ring-shaped cam member surrounding and engaging the end of said spindle coaxial with said spindle, to be moved by said spindle in a plane substantially normal to the axis of said spindle, whenever said spindle is pivoted about said pivot point, and having a concave cone-like cam surface engaging the surface of said spherical-shaped member;
   bracket means supporting said cam member for said movement by said spindle to effect movment of said spherical-shaped member along said axis of movement of said stop member corresponding to said longitudinal axis of said spindle;
   override resilient means for biasing said stop member along the axis of movement thereof in the direction of said spherical-shaped member;
   and means for limiting such biased movement of said stop member to a position normally spaced from said spherical-shaped member.

7. The combination defined in claim 6 and which includes means for supporting said spindle in said housing for movement along the longitudinal axis of said spindle.

8. The combination defined in claim 7 in which said supporting means comprises a sleeve mounted in said housing in coaxial relationship with said spindle and having an external peripheral groove therein, and which includes a further spherical-shaped member mounted in said housing in engagement with the wall of said groove for movement along an axis perpendicular to said longitudinal axis of said spindle upon movement of said spindle along said longitudinal axis, said further spherical-shaped member being coupled to at least a portion of said control valve means to actuate the same upon said movement of said spindle along said longitudinal axis.

9. The combination defined in claim 8 wherein said control valve means includes a spring-loaded spool member mounted for movement along said last-named perpendicular axis and biased against said further spherical-shaped member, said combination further including,
    a counterbalance spring mounted in said housing and engaging an end of said sleeve.

10. The combination defined in claim 8 and which includes a bias control mechanism mounted coaxially with said sleeve on one end of said sleeve, and including spring-biased pin members engaging said spindle to displace said spindle angularly about the aforesaid universal pivot point.

11. In a tracer valve assembly having a housing, an elongated spindle mounted in said housing for universal pivotal movement about a pivot point intermediate its ends, and control valve means at least a portion of which is actuated by pivotal movement of said spindle about said point, the combination of:
    a link assembly coupled to said control valve means and to said spindle at a point between the end thereof and said pivot point for translating universal pivotal movements of said spindle about said pivot point into two mutually perpendicular vectors of movement in said control valve means both essentially perpendicular to said longitudinal axis of said spindle, said link assembly including a block slidably mounted on said spindle and extending in a plane perpendicular to said longitudinal axis of said spindle;
    first and second mutually perpendicular guide pins spaced from said longitudinal axis and perpendicular respectively to said vectors, and being mounted on said block in essentially coplanar relationship therewith;
    a first connecting link mounted on said first pin for limited slidable movement with respect to said block along the longitudinal axis of said first pin;
    and a second connecting link mounted on said second pin for limited slidable movement with respect to said block along the longitudinal axis of said second pin.

12. In a tracer valve assembly having a housing, an elongated spindle mounted in said housing for universal pivotal movement about a pivot point intermediate its ends, and control valve means actuated by pivotal movement of said spindle about said point, the combination of:
    a sleeve member slidably mounted in said housing coaxial with said spindle for supporting said spindle in said housing for movement therewith along said longitudinal axis of said spindle, said sleeve member having an external peripheral groove therein, and which includes a spherical-shaped member mounted in said housing in engagement with the wall of said groove for movement along an axis perpendicular to said longitudinal axis of said spindle upon movement of said spindle and sleeve along said longitudinal axis, said further spherical-shaped member being coupled to at least a portion of said control valve means to actuate the same upon said movement of said spindle along said longitudinal axis.

13. The combination defined in claim 12 wherein said control valve means includes a spring-loaded spool member mounted for movement along an axis substantially perpendicular to said longitudinal axis and biased against said spherical-shaped member; said combination further including
    a counterbalance spring in said housing and engaging an end of said sleeve so as to cause the wall of said groove to bias said spherical-shaped member against said spring-loaded spool member.

14. In a tracer valve assembly having a housing, an elongated spindle mounted in said housing for universal pivotal movement about a pivot point intermediate its ends, and control valve means actuated by pivotal movement of said spindle about said point, the combination of:
    a sleeve member mounted for longitudinal and rotational movement in said housing in coaxial relationship with said spindle for supporting said spindle for movement therewith along said longitudinal axis of said spindle, and a bias control mechanism mounted coaxially with said sleeve on one end of said sleeve and including spring-biased pin members engaging said spindle to displace said spindle angularly about the aforesaid universal pivot point.

15. The combination defined in claim 14 in which said bias control mechanism includes radial lever means for rotating said control mechanism and said sleeve about said spindle so as to determine the direction of said angular displacement of said spindle.

16. The combination defined in claim 14 in which said bias control mechanism includes manual adjustment means for selectively causing said pin members to be spring-biased against said spindle, and which includes a valve mechanism controllable by the aforesaid longitudinal movement of said sleeve.

17. In a tracer valve assembly having a housing, an elongated spindle mounted in said housing for manual universal pivotal movement about a point intermediate its ends, and control valve means actuated by said pivotal movement, the combination of:
    limit means for tentatively limiting movement of said spindle to a tentative limit range;
    means for movably mounting said limit means for movement between a first position which tentatively limits movement of said spindle to said tentative limit range and another position which permits spindle movement beyond said tentative limit range;
    resilient means for biasing said limit means to said first position; and
    means for transmitting said pivotal movement of said spindle to effect movement of said limit means against the bias of said resilient means;
    whereby upon manual pivotal movement of said spindle, a tentative limit is encountered which may be overcome by added pivotal movement force on said spindle against the bias of said resilient means.

18. Assembly in accordance with claim 17, wherein said resilient means comprises a spring, and including means independent of the position of said limit means for adjusting the bias force exerted by said spring on said limit means.

19. Assembly in accordance with claim 17 wherein said spindle may also be moved longitudinally; and said limit means also tentatively limits said longitudinal movement of said spindle.

20. Assembly in accordance with claim 17, wherein said means for transmitting said pivotal movement is separate from said spindle and has an arcuate-shaped surface.

21. Assembly in accordance with claim 17, including engagement means for effecting engagement between said spindle and said limit means, said engagement means including:
    an annular member positioned circumjacent said spindle and engageable by said spindle to be moved in a plane substantially normal to the axis of said spindle and having a cone-like surface, and
    a second member having a surface engageable by said cone-like surface to effect engagement between said spindle and said limit means, upon pivotal movement of said spindle.

22. Assembly in accordance with claim 21, wherein said resilient means comprises a spring disposed coaxially of one end of said spindle, said spring biasing said limit means toward said spindle, said engagement means serves to translate pivotal movement of said spindle into a force on said limit means against the bias of said spring, said spindle is also movable longitudinally, and said limit means also tentatively limits said longitudinal movement of said spindle.

23. Assembly in accordance with claim 17, wherein said limit means is positioned coaxially adjacent one end of said spindle.

24. Assembly in accordance with claim 17, wherein said spindle may also be moved longitudinally, and said limit means also tentatively limits said longitudinal movement of said spindle.

25. Assembly of claim 17, including means for adjusting said limit means so as to adjust said limit range imposed upon said spindle.

References Cited

UNITED STATES PATENTS

| | | | |
|---|---|---|---|
| 2,618,244 | 11/1952 | Roehm | 251—3 X |
| 2,753,145 | 7/1956 | Rosebrook | 251—3 |
| 2,835,466 | 5/1958 | Rosebrook | 251—3 |
| 2,935,289 | 5/1960 | Chiappulini | 251—3 |
| 2,994,502 | 8/1961 | Ruzick et al. | 251—3 |
| 3,006,595 | 10/1961 | Rosebrook | 251—3 |
| 2,347,368 | 4/1944 | Rosen | 251—3 XR |
| 2,836,387 | 5/1958 | Rosebrook | 251—3 |
| 3,186,425 | 6/1965 | Weaver | 251—3 XR |

ALAN COHAN, *Primary Examiner.*

R. GERARD, *Assistant Examiner.*